United States Patent
Mair et al.

(10) Patent No.: US 10,240,626 B2
(45) Date of Patent: Mar. 26, 2019

(54) METHOD FOR PRODUCING A SECURING ARRANGEMENT AND SECURING ARRANGEMENT

(71) Applicant: SFS intec Holding AG, Heerbrugg (CH)

(72) Inventors: Roland Mair, Gotzis (AT); Marco Zach, Diepoldsau (CH)

(73) Assignee: SFS intec Holding AG, Heerbrugg (CH)

( * ) Notice: Subject to any disclaimer, the term of this patent is extended or adjusted under 35 U.S.C. 154(b) by 120 days.

(21) Appl. No.: 15/111,278

(22) PCT Filed: Jan. 19, 2015

(86) PCT No.: PCT/EP2015/050842
§ 371 (c)(1),
(2) Date: Jul. 13, 2016

(87) PCT Pub. No.: WO2015/110376
PCT Pub. Date: Jul. 30, 2015

(65) Prior Publication Data
US 2016/0341236 A1   Nov. 24, 2016

(30) Foreign Application Priority Data

Jan. 23, 2014 (DE) .................. 10 2014 000 894

(51) Int. Cl.
*F16B 5/02* (2006.01)
*F16B 25/00* (2006.01)
*F16B 25/10* (2006.01)

(52) U.S. Cl.
CPC ........ *F16B 25/0021* (2013.01); *F16B 5/0241* (2013.01); *F16B 25/0063* (2013.01); *F16B 25/106* (2013.01); *Y10T 29/49963* (2015.01)

(58) Field of Classification Search
CPC .. Y10T 29/49963; F16B 35/041; F16B 35/04; F16B 25/0036
(Continued)

(56) References Cited

U.S. PATENT DOCUMENTS

| 2,321,379 A | 6/1943 | Green |
| 3,370,501 A | 2/1968 | Ansingh |

(Continued)

FOREIGN PATENT DOCUMENTS

| DE | 2732695 | 8/1978 |
| DE | 8125414 | 12/1981 |

(Continued)

*Primary Examiner* — Jermie Cozart
(74) *Attorney, Agent, or Firm* — Volpe and Koenig, P.C.

(57) ABSTRACT

A method of producing fastening assembly (10) including a series of layers (12, 14, 16) and a screw (18), the screw (18) having a screw head (20), a shaft (24), a thread (26) extending into a displacement tip (22) and an unthreaded shaft portion (28). The method includes screwing the screw (18) into the series of layers (12, 14, 16), the layer (14) in the series of layers (12, 14, 16) that is furthest from the screw head (20) being deformed in the screw-in direction, so that a thickness $D_p$ of the series of layers (12, 14, 16) is increased in a region around the screw (18), and continuing to screw in the screw (18) until the screw head (20) strikes the series of layers, a maximum thickness $D_{p,\,max}$ of the series of layers being reached at this moment and the length $L_F$ of the unthreaded shaft portion (28) being up to 10% less than and up to 30% greater than the maximum thickness $D_{p,\,max}$ of the series of layers.

16 Claims, 2 Drawing Sheets

(58) Field of Classification Search
USPC .................. 411/378, 393, 411, 424, 426
See application file for complete search history.

(56) References Cited

U.S. PATENT DOCUMENTS

| | | | |
|---|---|---|---|
| 4,241,638 | A | 12/1980 | Shimizu et al. |
| 5,329,738 | A | 7/1994 | Ovaert et al. |
| 7,677,854 | B2 * | 3/2010 | Langewiesche ........ F16B 25/00 411/386 |
| 2007/0269288 | A1 | 11/2007 | Palm |

FOREIGN PATENT DOCUMENTS

| | | |
|---|---|---|
| DE | 69200316 | 8/1994 |
| DE | 20211445 | 11/2002 |
| DE | 102004034246 | 2/2006 |
| WO | 9721932 | 6/1997 |

\* cited by examiner

METHOD FOR PRODUCING A SECURING ARRANGEMENT AND SECURING ARRANGEMENT

BACKGROUND

The invention relates to a method for producing a fastening assembly comprising a series of layers and a screw, the screw comprising a screw head equipped with a driving point, a shaft extending into a displacement tip, a thread extending into the displacement tip and an unthreaded shaft portion arranged between the thread and the screw head.

Furthermore, the invention relates to a fastening assembly and to a screw for such a fastening assembly.

The method, fastening assemblies and screws described here are usually used for fastening the outer and inner metal sheets of sandwich panels. Here, the series of metal sheets is intended to be held together by fasteners, which are cost-effective and can be inserted easily and rapidly during use.

All of the conventional prior-art solutions provide for boring the metal sheets that are to be connected, whether this is carried out by pilot-boring using a conventional drill or by using a screw having a boring tip. If pilot boring is carried out using a conventional drill, riveting or screwing can be carried out subsequently. If the fastener is a screw, then reverse locking should always be provided, which prevents the fasteners from being lost from the fastening assembly, in particular due to external influences such as vibrations or the like. For this purpose, an unthreaded shaft portion is conventionally used in that it is possible for the thread to simply end before reaching the screw head.

If a fastener that is inserted into a pilot hole is not selected as a fastener for the fastening assembly but instead a fastener having a displacement tip is selected, then it is no longer practical to use a thread that ends axially in a point. Here, according to the prior art, double threads have to be used in order to ensure the required reverse locking. However, double threads are comparatively complex and expensive to produce.

Screws that have a thread which extends into the tip are known in particular as wood screws. It is likewise known to equip such screws with an unthreaded portion between the head and the end of the thread. For example, such a screw is described in DE 202 11 445 U1.

SUMMARY

The problem addressed by the invention is to provide a fastening assembly in which a screw can be screwed into a series of layers, in particular a series of metal sheets, in a simple manner without pilot-boring, sufficient reverse locking being provided at the same time. It is intended that high tightening forces can be generated and high shear forces can be absorbed.

The invention builds on the generic method by way of the following steps:
  screwing the screw into the series of layers, at least the layer in the series of layers that is furthest from the screw head being deformed in the screw-in direction, so that a thickness $D_p$ of the series of layers is increased in a region directly around the screw,
  continuing to screw in the screw until the screw head strikes the series of layers, a maximum thickness $D_{p,\,max}$ of the series of layers being reached at this moment and the length $L_F$ of the unthreaded shaft portion being up to 10% less than and up to 30% greater than the maximum thickness $D_{p,\,max}$ of the series of layers.

By suitably selecting the length $L_F$ of the unthreaded shaft portion in this way, it is ensured that the thread is no longer, or is only slightly, in engagement with the series of layers once the screw has been completely screwed in, that is to say when the screw head is in contact with the outer layer of the series of layers in particular. If, at this moment, a considerable portion of the thread that still has not penetrated the series of layers were still available, the series of layers would delaminate once the screw head strikes the outer layer, since the thread that is still in engagement with the layer arrangement would at least pull the furthest layer towards the screw head until the unthreaded shaft portion is reached. If, however, the screw stops being screwed in at a moment at which delamination has yet to occur, the thread is however still in engagement with the series of layers, and so the fastening assembly is not provided with any reverse locking. However, the unthreaded portion should not be excessively long because if it is, the screw has too large an amount of play in its final position. Where it is discussed above that a maximum thickness of the series of layers is reached at the moment at which the screw head strikes the series of layers, this does not necessary mean that the maximum thickness of the series of layers is reached precisely at the moment of striking. Instead, this thickness may also already have been reached beforehand. The point in time at which the maximum layer thickness is reached is not important, provided that it is reached when the screw head strikes the series of layers.

For the above-mentioned reasons, it is particularly expedient for the length $L_F$ of the unthreaded shaft portion to be up to 5% less than and up to 20% greater than the maximum thickness $D_{p,\,max}$ of the series of layers.

It is further preferable for the length $L_F$ of the unthreaded shaft portion to be up to 3% less than and up to 10% greater than the maximum thickness $D_{p,\,max}$ of the series of layers.

Furthermore, it may be provided that the length $L_F$ of the unthreaded shaft portion is equal to the maximum thickness $D_{p,\,max}$ of the series of layers, so that the screw stops being screwed in when the screw head strikes the series of layers. As a result, it is ensured that the screw is seated in the fastening assembly virtually without play.

In this context, it is particularly advantageous for the length $L_F$ of the unthreaded shaft portion to be less than the maximum thickness $D_{p,\,max}$ of the series of layers, and, by continuing to turn the screw, for the thickness of the series of layers to be reduced to a final thickness $D_{p,\,end}$ of the series of layers, the length $L_F$ of the unthreaded shaft portion being equal to the final thickness $D_{p,\,end}$ of the series of layers. As a result of this method, the screw is seated under tension in the fastening assembly owing to the restoring force of the decreasing thickness of the series of layers, resulting in particular stability.

According to another preferred embodiment of the fastening assembly according to the invention, it is provided that at least part of the unthreaded shaft portion has a diameter which is greater than the core diameter of the thread and less than the outer diameter of the thread. Since at least the outer layer of the series of layers will generally be pilot-bored such that the thread of the screw can be guided through the hole without contact, the hole has a significantly greater diameter than the core of the thread. By at least part of the unthreaded shaft portion now being selected to have a greater diameter than the core of the thread, the play in the hole in the outer layer is reduced. Likewise, in this way the edge of the funnel-like structure, which is formed when the screw is screwed into at least the lowermost layer, rests fully on the unthreaded portion having an increased diameter, and this likewise contributes to the stability of the entire fastening assembly.

Likewise, it may be provided that at least part of the unthreaded shaft portion has a diameter which is less than or equal to the core diameter of the thread. This means that the unthreaded shaft portion penetrates the layer arrangement without friction.

It may be provided that the unthreaded shaft portion has, adjacent to the screw head, a shoulder having a shaft diameter that is greater than the core diameter of the thread.

According to another particularly preferred embodiment of the invention, it is provided that the thread comprises, adjacent to the unthreaded shaft portion, a plurality of support points for the series of layers which are the same distance from the screw head, the support points delimiting the unthreaded shaft portion. As result, when the screw is recessed, the funnel-like structure contacts not only the "cut-off" end of the thread, but also a plurality of points, as a result of which the stability of the fastening assembly is increased.

In particular, it may be provided that the plurality of support points are formed such that the thread extends into a planar, radially extending plane so as to be adjacent to the unthreaded shaft portion. This plane may for example surround the entire circumference of the shaft, so that the funnel edge evenly absorbs the force of screw. Depending on the shape of the funnel edge, the contact may be planar, or linear.

It may likewise be provided that the plurality of support points are formed such that there is a double thread or multiple threads. The plurality of threads end at various points over the circumference of the screw shaft, if they are intended to be same distance from the screw head. As a result, the force of screw is absorbed more evenly by the funnel edge when the screw is being recessed than it would be if just one end of a thread were involved in absorbing force.

According to a specific embodiment, it is provided that the unthreaded shaft portion directly adjoins the tip. In the context of the invention, a cylindrical, thread-bearing shaft portion is in particular not provided between the unthreaded shaft portion and the tip. Instead, the unthreaded shaft portion can transition directly into the conical, thread-bearing tip.

It may be provided that a screw having a thread diameter of greater than 5.8 mm is used. At least in preferred embodiments, the present invention makes use of the bulge of displaced material of the series of layers in the screw-in direction of the screw. Since the quantity of displaced material and therefore also the change in the layer thickness when screwing in the screw depends on the thread diameter of the screw, the advantageous claimed effects manifest differently for different thread diameters. It has been demonstrated that particularly advantageous results can be achieved using thread diameters of above 5.8 mm.

Furthermore, it may also be provided that a screw having a thread diameter of greater than 6.5 mm is used.

In this context, it is expedient for the layer that is furthest from the screw head to have a maximum thickness of 1 mm. In particular, the thickness of the layer that is furthest from the screw head has a significant influence on the displacement mechanism described, which is why certain layer thicknesses have particularly advantageous effects, in particular those of less than 1 mm or even of 0.7 mm or less than 0.5 mm. On this basis, the method is suitable for attaching profiled parts and other superstructures requiring high torque values to façades comprising very thin outer layers.

In particular for outdoor uses, the screw may be made in part or completely of an austenitic material.

The invention further relates to a fastening assembly which is produced in accordance with a method according to the invention.

Furthermore, the invention relates to a screw for use in a method according to the invention.

BRIEF DESCRIPTION OF THE DRAWINGS

The invention will now be explained by way of example on the basis of particularly preferred embodiments with reference to the accompanying drawings, in which.

DETAILED DESCRIPTION OF THE PREFERRED EMBODIMENTS

Figure 1:
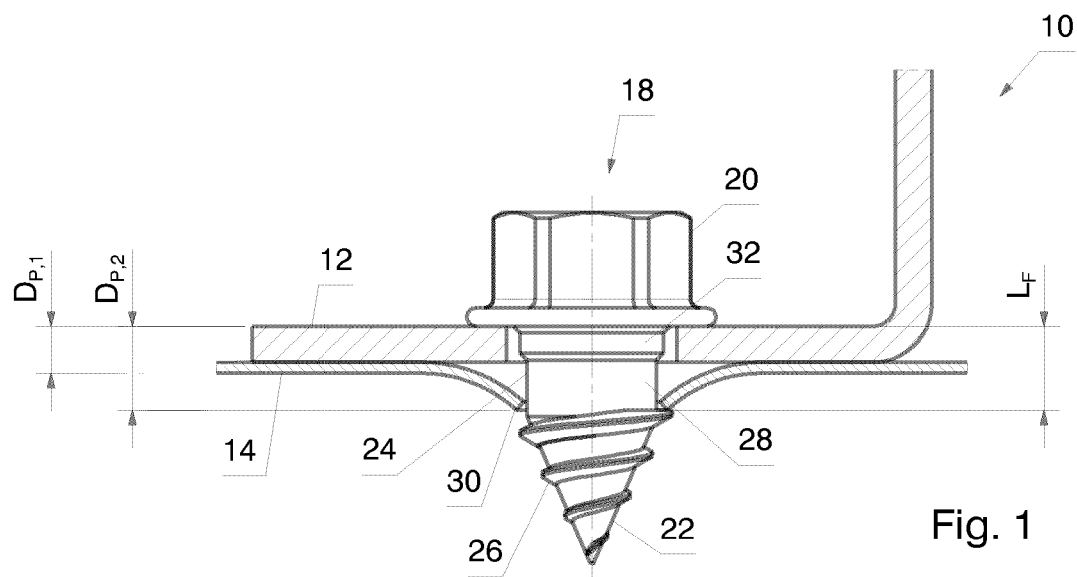
FIG. 1 shows a first embodiment of a fastening assembly according to the invention.

In the following description of the figures, like reference numerals denote like or similar elements.

FIG. 1 shows a first embodiment of a fastening assembly 10 according to the invention. The fastening assembly 10 comprises a thin metal sheet 14 and an additional metal sheet 12 arranged thereon, which in the present embodiment is thicker than the thin metal sheet 14. The metal sheets 12, 14 form a series of metal sheets or series of layers 12, 14. The fastening assembly 10 also comprises a screw 18 comprising a screw head 20 and a displacement tip 22. A thread 26 extends into the displacement tip 22. The displacement tip 22 and the head 20 of the screw 18 are interconnected by a shaft 24. In the present embodiment, the shaft 24 is entirely unthreaded, i.e. the displacement tip 22 that comprises the thread 26 and tapers away from the screw head 20 is starts directly on the shaft 24. In other words, the unthreaded shaft portion 28 has a length $L_F$ that corresponds to the total length of the shaft 24. The shaft 24 also comprises a shoulder 32 which has a greater diameter than the unthreaded shaft portion 28, or in this case the entire shaft 24. This shoulder 32 provides improved seating of the screw 20 in the hole in the outer metal sheet 12 of the series of layers 12, 14.

Before the screw 18 is screwed into the series of layers 12, 14, in this embodiment and in all the other embodiments set out here the outer metal sheet 12 already has a hole. This is not necessary, but preferred. Before the screw 18 is screwed in, the thin metal sheet 14 is generally intact, and it is in planar contact with the outer metal sheet 12. The thin metal sheet 14 extends over the hole in the outer metal sheet 12 and generally does not have any deformations, or has deformations that are insignificant in these contexts. Before the screw 18 is screwed in, the series of layers 12, 14 has a constant thickness $Dp,_1$ in the entire region surrounding the screw, with constant metal-sheet thicknesses being assumed. If the screw 18 is then guided through the hole in the outer metal sheet 12 and screwed into the thin metal sheet 14, then the displacement tip 22 of the screw 18 displaces material from the thin sheet 14 in the screw-in direction of the screw 18. This forms a funnel-like structure 30. In the finished state of the fastening assembly 10 that is shown, the series of layers 12, 14 has an increased thickness $D_{p,2}$ in the direct vicinity of the screw 18 as a result. In the present embodiment, this increased thickness $D_{p,2}$ corresponds to the length $L_F$ of the unthreaded shaft portion 28. In this finished state of the fastening assembly 10, the thread 26 of the screw 18 is no longer in engagement with the series of layers 12, 14, i.e. is in particular no longer in engagement with the thin metal sheet 14. However, the funnel-like structure 30 in the thin metal sheet 14 provides a stop, which prevents the screw 18 from pulling out or loosening.

The finished state of the fastening assembly 10 that is shown can be achieved in various ways, depending on the lengths, thicknesses and materials involved. In the simplest case, the length $L_F$ of the unthreaded shaft portion 28 is precisely coordinated with the type and nature of the other components such that the finished state of the fastening assembly 10 that is shown is reached at the moment at which the screw head 20 is resting on the outer metal sheet 12, that is to say the thread 26 makes the funnel-like structure 30 in the thin metal sheet 14 precisely at this moment. It is however also possible and particularly preferred for the thread 26 to still be in slight engagement with the funnel-like structure 30 when the screw head 20 is resting on the outer metal sheet 12. The screw 18 turning further then causes the funnel-like structure 30 to be pulled back in the direction of the screw head. Only then does the funnel-like structure 30 come out of engagement with the thread 26. At this moment, the fastening assembly 10 is under tension due to the forces exerted by the screw head 18 and the thread 26 on the series of layers 12, 14, and therefore a particularly stable fastening assembly 10 is produced.

Figure 2:
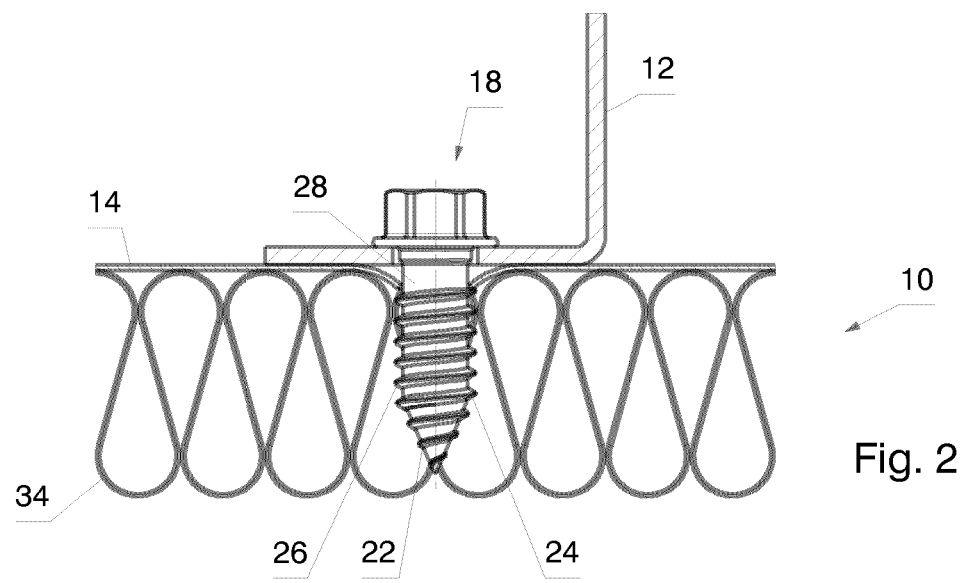
FIG. 2 shows a second embodiment of a fastening assembly according to the invention.

FIG. 2 shows a second embodiment of a fastening assembly 10 according to the invention. The fastening assembly 10 bears an insulating layer 34, which is connected to a very thin metal sheet 14 having a thickness of one millimeter, for example. By contrast with the fastening assembly shown in FIG. 1, a screw 18 is incorporated into the fastening assembly 10 according to FIG. 2 which comprises a thread-bearing shaft portion in addition to the unthreaded shaft portion 28. Starting from said thread-bearing portion, the thread 26 extends into the displacement tip 22 of the screw 18.

Figure 3:
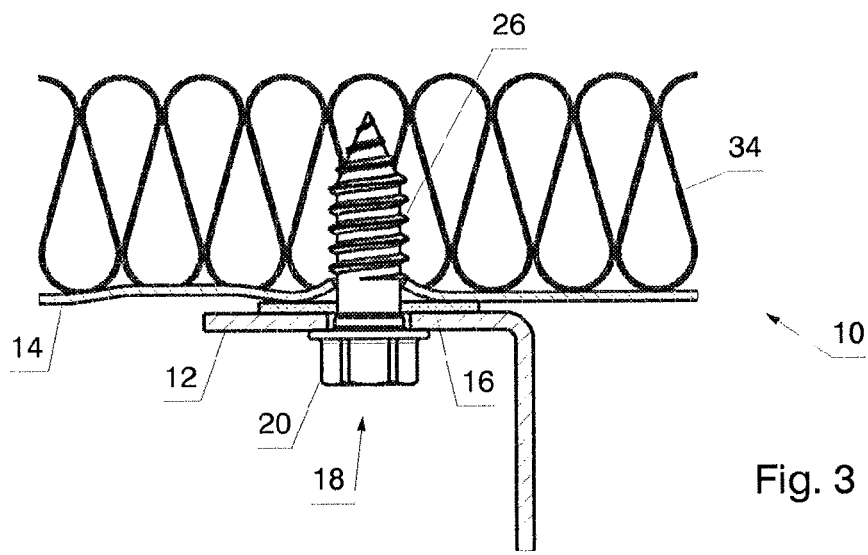
FIG. 3 shows a third embodiment of a fastening assembly according to the invention.

FIG. 3 shows a third embodiment of a fastening assembly 10 according to the invention. The fastening assembly 10 shown here largely corresponds to that shown in FIG. 1. However, the inner metal sheet 14 is not a planar metal sheet, but a profiled metal sheet. Another difference is that the outer metal sheet 12 does not rest directly on the metal sheet 14 bearing the insulating layer 34. Instead, an intermediate element 16 is provided, which may also be designed as a metal sheet. The intermediate element 16 may also be designed as a plate, which consists of metal or for example of an elastomer. In particular, the intermediate element 16 may be a sealing strip. This is compressible, so that the series of layers 12, 14, 16 as a whole can be compressed if the thread 26 is still in engagement with the inner metal sheet 14 when the screw head 20 is resting on the metal sheet 12. As a result, relatively long thread lengths that are still in engagement with the inner metal sheet 14 at the moment at which the screw head 20 is resting on the outer metal sheet 12 are tolerated without undesired delamination of the series of layers. A fastening assembly using the sealing strip is suitable in particular for outdoor uses, while a fastening assembly without a sealing strip, as shown for example in FIG. 1, is suitable in particular for indoor uses.

Figure 4:
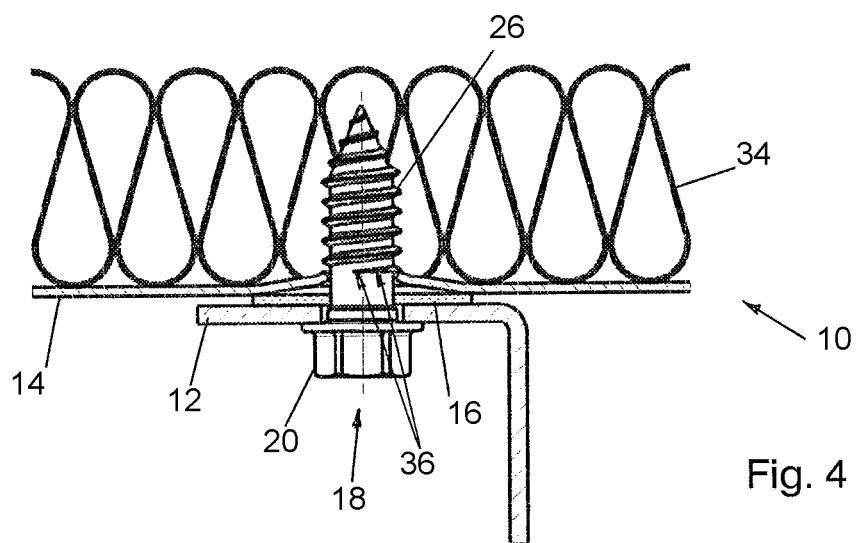
FIG. 4 shows a fourth embodiment of a fastening assembly according to the invention.

FIG. 4 shows a fourth embodiment of a fastening assembly 10 according to the invention. The fastening assembly 10 according to FIG. 4 corresponds to that shown in FIG. 3. By contrast with FIG. 3, the inner metal sheet 14 is not profiled in this case, but is planar.

As shown in FIG. 4, adjacent to the unthreaded shaft portion 28, a plurality of support points 36 for the series of layers 12, 14, 16 which are an equal distance from the screw head 20 are provided by area where the thread extends into a planar, radially extending plane so as to be adjacent to the unthreaded shaft portion 28. The support points 36 delimit the unthreaded shaft portion 28.

The features of the invention disclosed in the above description, the drawings and the claims can be essential to the implementation of the invention both individually and in any combination.

LIST OF REFERENCE NUMERALS 10 fastening assembly
12 metal sheet
14 metal sheet
16 intermediate element
18 screw
20 screw head
22 tip
24 shaft
26 thread
28 unthreaded shaft portion
30 funnel-like structure
32 shoulder
34 insulating layer

The invention claimed is:

1. A method for producing a fastening assembly (10) comprising a series of solid layers (12, 14, 16) that are in contact with one another and a screw (18), the screw (18) comprising a screw head (20) equipped with a driving point, a shaft (24) extending into a displacement tip (22), a thread (26) extending into the displacement tip and an unthreaded shaft portion (28) arranged between the thread (26) and the screw head (20), the method comprising the following steps:
screwing the screw (18) into the series of solid layers (12, 14, 16), at least one of the layers (14) in the series of layers (12, 14, 16) that is furthest from the screw head (20) being deformed in a screw-in direction, so that a thickness $D_p$ of the series of solid layers (12, 14, 16) is increased in a region directly around the screw (18) due to the deformation,
continuing to screw in the screw (18) until the screw head (20) contacts and is supported on a flat surface of a first of the series of solid layers, a maximum thickness $D_{p,max}$ of the series of solid layers being reached at this moment and a length $L_F$ of the unthreaded shaft portion (28) is up to 10% less than or up to 30% greater than the maximum thickness $D_{p,max}$ of the series of solid layers.

2. The method according to claim 1, wherein the length $L_F$ of the unthreaded shaft portion (28) is up to 5% less than or up to 20% greater than the maximum thickness $D_{p,max}$ of the series of solid layers.

3. The method according to claim 1, wherein the length $L_F$ of the unthreaded shaft portion (28) is up to 3% less than or up to 10% greater than the maximum thickness $D_{p,max}$ of the series of solid layers.

4. The method according to claim 1, wherein the length $L_F$ of the unthreaded shaft portion (28) is equal to the maximum thickness $D_{p,max}$ of the series of solid layers, so that the screw stops being screwed in when the screw head (20) strikes the series of solid layers.

5. The method according to claim 1, wherein the length $L_F$ of the unthreaded shaft portion (28) is less than the maximum thickness $D_{p,\,max}$ of the series of solid layers, and by continuing to turn the screw, the thickness of the series of solid layers is reduced to a final thickness $D_{p,\,end}$ of the series of solid layers, the length $L_F$ of the unthreaded shaft portion (28) being equal to the final thickness $D_{p,\,end}$ of the series of solid layers.

6. The method according to claim 1, wherein at least part of the unthreaded shaft portion (28) has a diameter which is greater than a core diameter of the thread (26) and less than an outer diameter of the thread.

7. The method according to claim 1, wherein at least part of the unthreaded shaft portion (28) has a diameter which is less than or equal to a core diameter of the thread (26).

8. The method according to claim 1, wherein the unthreaded shaft portion (28) has, adjacent to the screw head, a shoulder (32) having a shaft diameter that is greater than a core diameter of the thread.

9. The method according to claim 1, wherein the thread (26) comprises, adjacent to the unthreaded shaft portion (28), a plurality of support points for the series of layers (12, 14, 16) which are an equal distance from the screw head (20), the support points delimiting the unthreaded shaft portion (28).

10. The method according to claim 9, wherein the plurality of support points are formed by the thread (26) extending into a planar, radially extending plane adjacent to the unthreaded shaft portion (28).

11. The method according to claim 9, wherein the plurality of support points are formed via a double thread or multiple threads.

12. The method according to claim 1, wherein the unthreaded shaft portion directly adjoins the tip.

13. The method according to claim 1, further comprising using a screw having a thread diameter of greater than 5.8 mm.

14. The method according to claim 1, further comprising using a screw having a thread diameter of greater than 6.5 mm.

15. The method according to claim 1, wherein the layer (14) that is furthest from the screw head (20) has a maximum thickness of 1 mm.

16. A fastening assembly (10), produced in accordance with a method according to claim 1.

* * * * *